(12) United States Patent
Takezawa et al.

(10) Patent No.: US 10,625,599 B2
(45) Date of Patent: Apr. 21, 2020

(54) FILLING APPARATUS

(71) Applicant: TATSUNO CORPORATION, Tokyo (JP)

(72) Inventors: Masahiro Takezawa, Tokyo (JP); Yuki Terasoma, Tokyo (JP); Kiyoshi Kimura, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 56 days.

(21) Appl. No.: 16/032,776

(22) Filed: Jul. 11, 2018

(65) Prior Publication Data

US 2019/0016210 A1  Jan. 17, 2019

(30) Foreign Application Priority Data

Jul. 11, 2017  (JP) .................................. 2017-135267

(51) Int. Cl.
*B60K 15/03* (2006.01)
*F17C 5/00* (2006.01)

(52) U.S. Cl.
CPC .......... *B60K 15/03006* (2013.01); *F17C 5/00* (2013.01); *B60K 2015/03019* (2013.01);
(Continued)

(58) Field of Classification Search
CPC .... F17C 5/00; F17C 5/04; F17C 5/007; F17C 2221/012; F17C 2265/065; F16L 37/38; B60K 15/03; B60K 2015/03315
(Continued)

(56) References Cited

U.S. PATENT DOCUMENTS 6,035,894 A * 3/2000 Weh .................... F16L 37/1215
137/614.05
6,343,630 B1   2/2002 Dubinsky
(Continued)

FOREIGN PATENT DOCUMENTS

EP        1437543 A1    7/2004
EP        3324096 A1    5/2018
(Continued)

OTHER PUBLICATIONS

European Search Report for EP 18 18 2463; dated Nov. 9, 2018 (9 pages).

*Primary Examiner* — Timothy L Maust
(74) *Attorney, Agent, or Firm* — Stetina Brunda Garred and Brucker; Mark B. Garred

(57) ABSTRACT

To provide a filling apparatus in which when a pipe joint of a filling nozzle and a vehicle side filling port (receptacle) are connected with each other, a lever surely positions outward a swelling portion at an end of a clutch and a condition that the selling portion at the end of the clutch engages an engaging recessed portion of the receptacle is maintained, which allows a condition that the pipe joint of the filling nozzle and the vehicle side filling port (receptacle) are connected with each other to be continued. The filling apparatus (100) including: a storage tank (50); a filling nozzle (10) for filling hydrogen from the storage tank (50) via a fuel filling mechanism and a vehicle side filling port (20) to an in-vehicle hydrogen filling tank (41); a clutch mechanism (12) for maintaining a condition that the filling nozzle (10) and the vehicle side filling port (20) are connected with each other; and a lever position moving mechanism (13) for moving the lever (5) radially outward an end portion of the clutch mechanism (2) on the vehicle side
(Continued)

filling port (20) side when the filling nozzle (10) and the vehicle side filling port (20) are connected with each other.

10 Claims, 7 Drawing Sheets

(52) U.S. Cl.
CPC ............. *B60K 2015/03315* (2013.01); *F17C 2201/056* (2013.01); *F17C 2205/037* (2013.01); *F17C 2205/0329* (2013.01); *F17C 2205/0352* (2013.01); *F17C 2205/0376* (2013.01); *F17C 2205/0382* (2013.01); *F17C 2221/012* (2013.01); *F17C 2225/0123* (2013.01); *F17C 2225/036* (2013.01); *F17C 2250/0636* (2013.01); *F17C 2260/028* (2013.01); *F17C 2265/065* (2013.01); *F17C 2270/0139* (2013.01); *F17C 2270/0168* (2013.01); *F17C 2270/0178* (2013.01)

(58) Field of Classification Search
USPC .................................................. 141/301, 350
See application file for complete search history.

(56) References Cited

U.S. PATENT DOCUMENTS

| | | | | |
|---|---|---|---|---|
| 6,904,944 | B2* | 6/2005 | Satou | F17C 5/00 |
| | | | | 141/100 |
| 7,028,724 | B2* | 4/2006 | Cohen | F02M 21/0206 |
| | | | | 141/392 |
| 9,435,488 | B2* | 9/2016 | Nagura | F17C 5/06 |
| 9,528,650 | B2* | 12/2016 | Tiberghien | F16L 37/086 |
| 9,579,970 | B2* | 2/2017 | Esl | F17C 13/04 |
| 10,451,220 | B2* | 10/2019 | Lee | B01D 46/521 |
| 2007/0044864 | A1* | 3/2007 | Mathison | B60K 15/04 |
| | | | | 141/98 |
| 2007/0155224 | A1 | 7/2007 | Marot et al. | |
| 2016/0010798 | A1 | 1/2016 | Yoshihiro et al. | |
| 2016/0178126 | A1* | 6/2016 | Lee | F17C 11/007 |
| | | | | 141/1 |

FOREIGN PATENT DOCUMENTS

| | | |
|---|---|---|
| EP | 3324097 A1 | 5/2018 |
| JP | 2014109350 A | 6/2014 |

\* cited by examiner

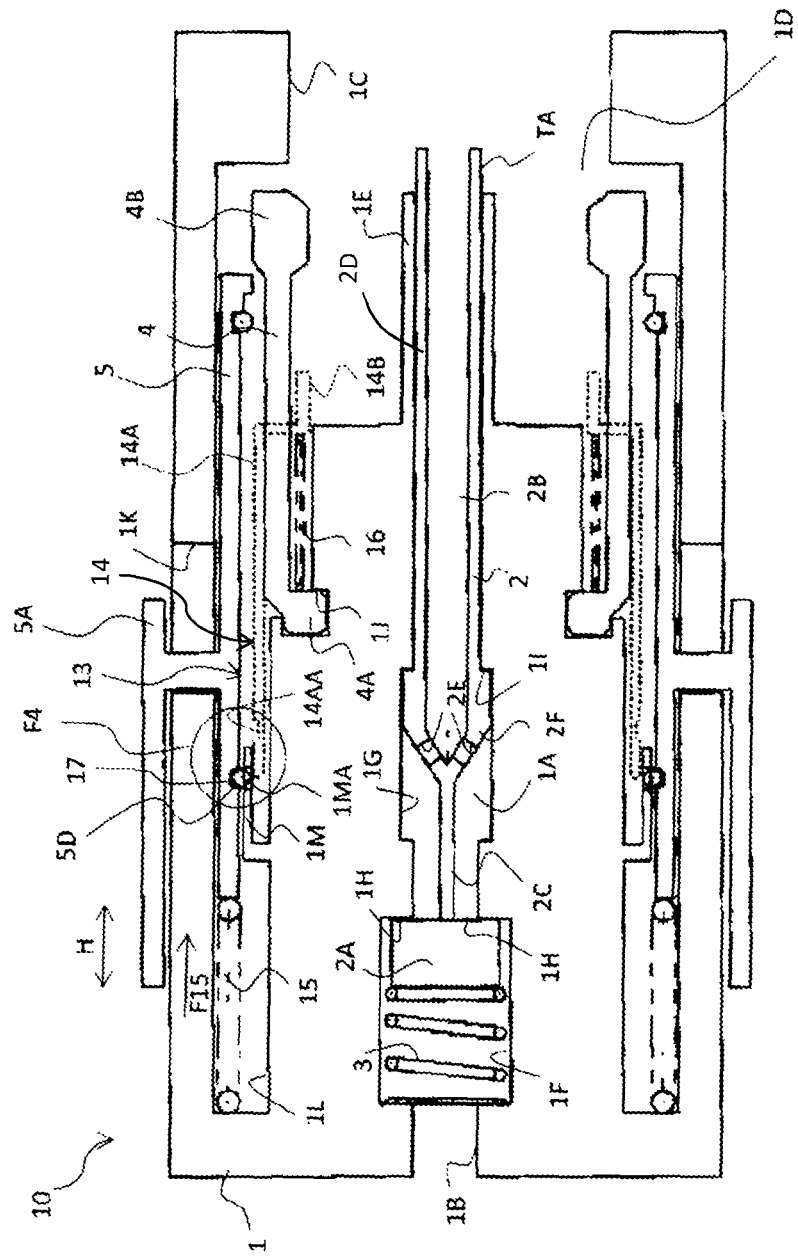
[FIG. 1]

[Fig. 2]
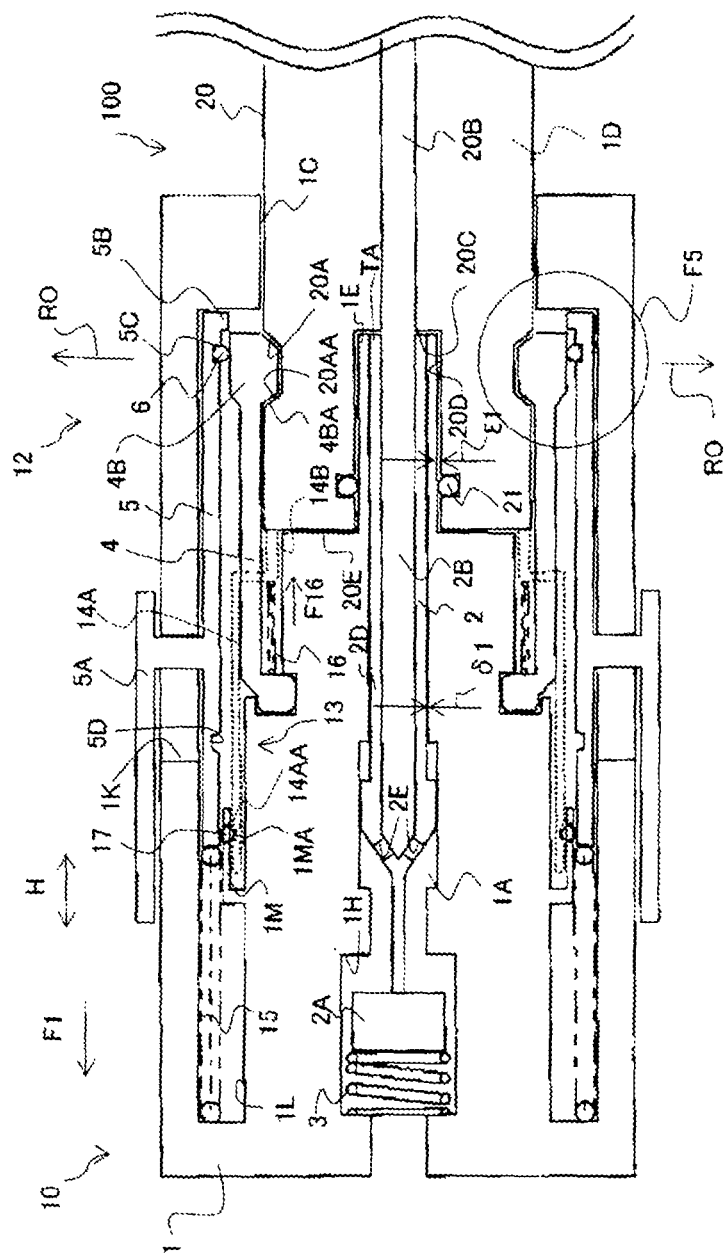

[Fig. 3]
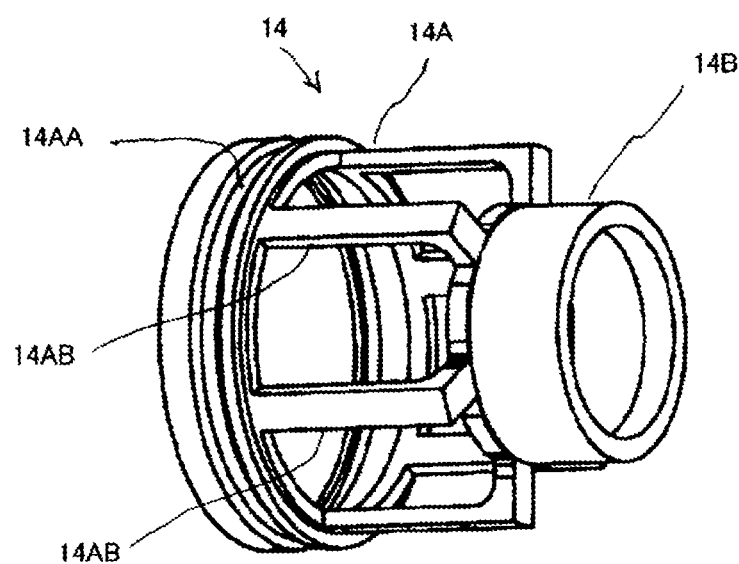

[Fig. 4]
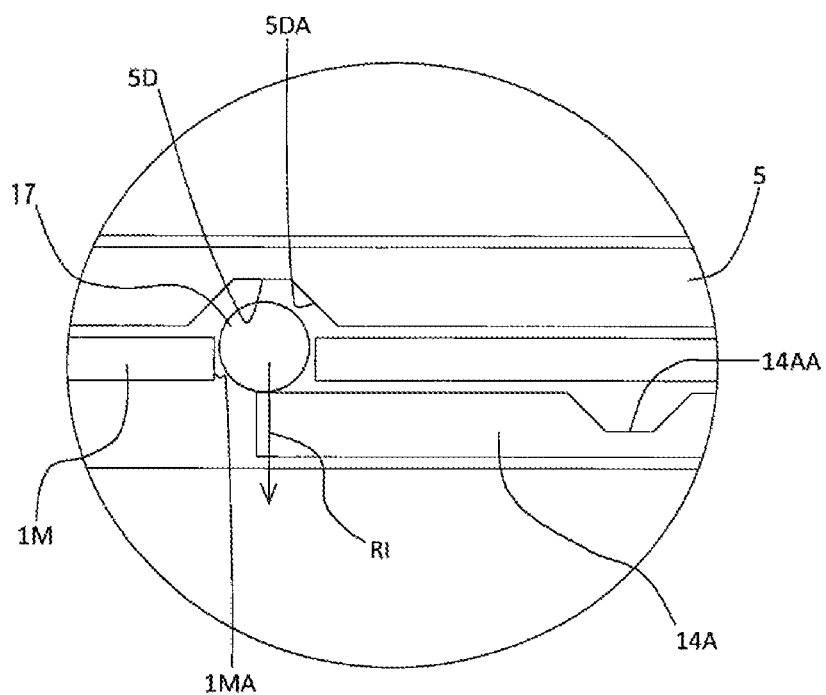

[Fig. 5]
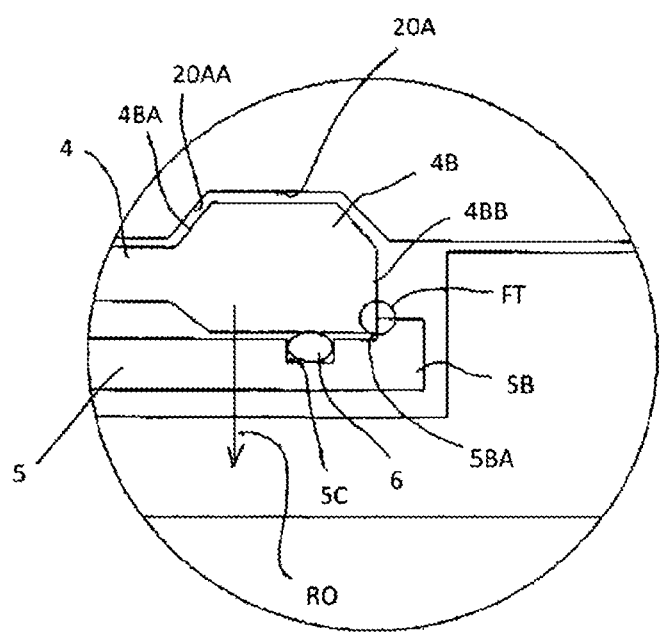

[Fig. 6]
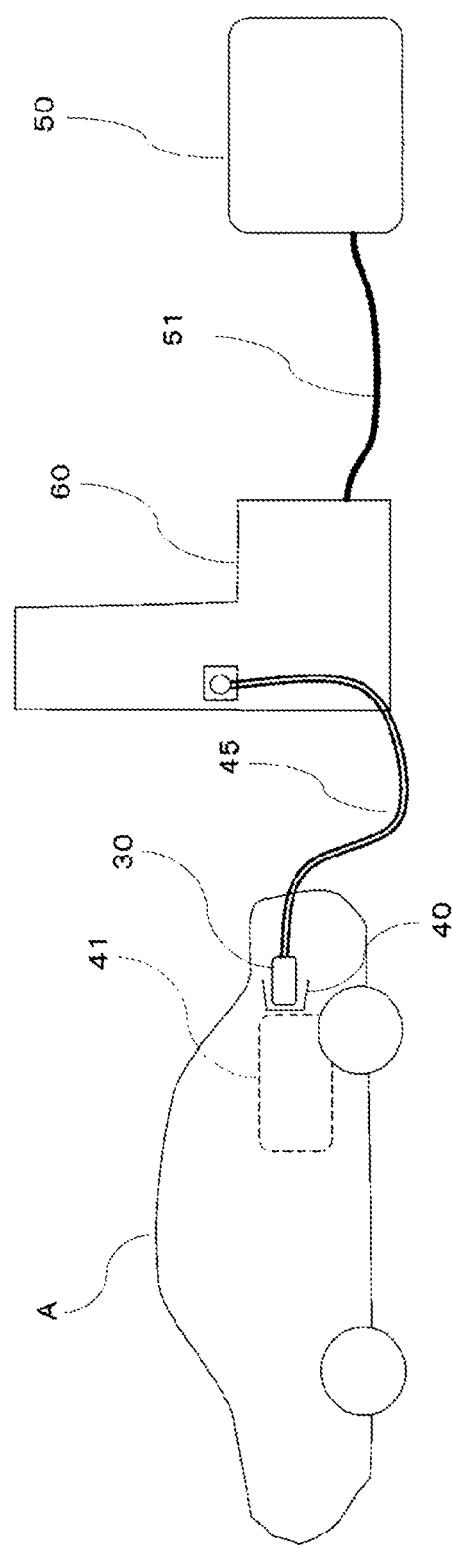

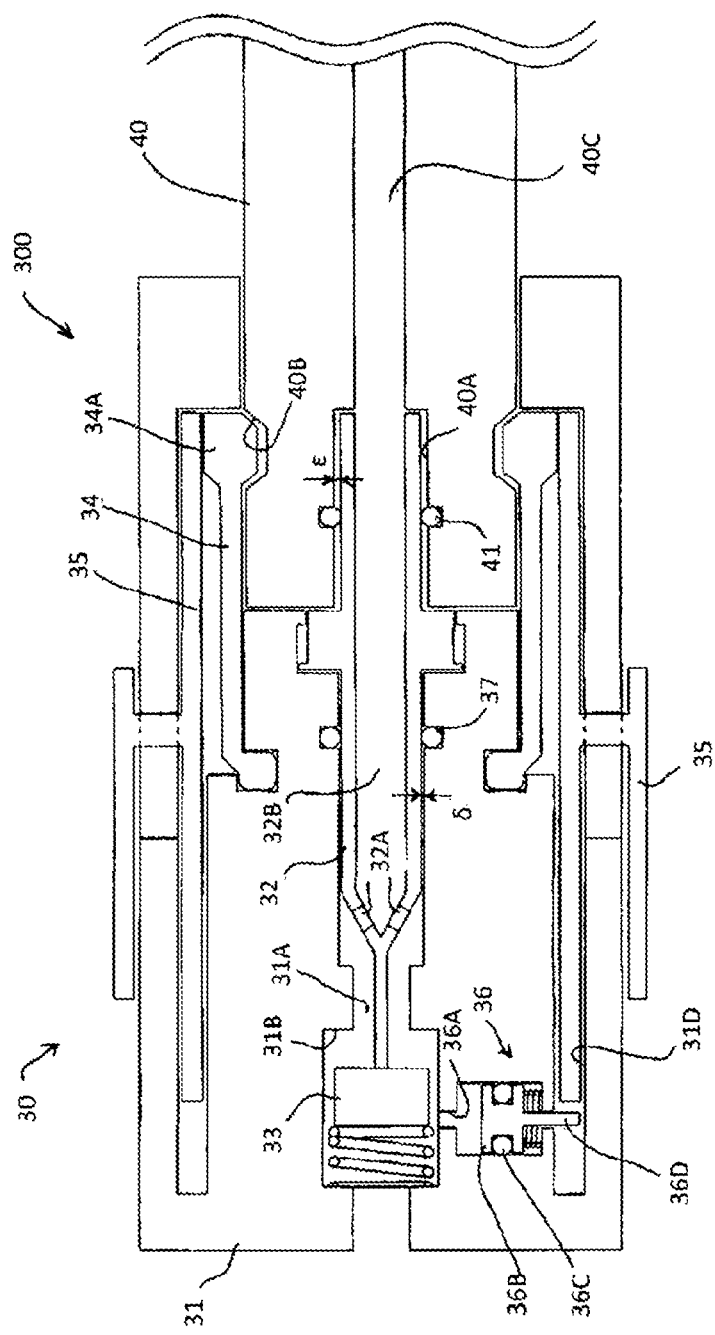
[Fig. 7]

FILLING APPARATUS

CROSS-REFERENCE TO RELATED APPLICATIONS

The present application claims priority to Japanese Patent Application No. 2017-135267 filed on Jul. 11, 2017, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a filling apparatus for filling gas such as hydrogen gas used for fuel or the like.

2. Description of the Related Art

For example, to a vehicle using hydrogen as fuel, as shown in FIG. 6, at a hydrogen filling station with a hydrogen storage tank 50 and a fuel filling system having a dispenser 60, a filling hose 45 and so on is filled hydrogen after a filling nozzle 30 and a receptacle 40 as a vehicle side filling port are connected with each other, and the filling is performed while being controlled depending on the maximum using pressure of a hydrogen tank 41 mounted in a vehicle A. In addition, the numeral 51 shows a piping system for feeding hydrogen from the hydrogen storage tank 50 to the dispenser 60. The present applicant has been already proposed the hydrogen filling apparatus described above (refer to Japanese patent publication No. 2014-109350 gazette for example). The hydrogen filling apparatus is effective, but when hydrogen gas is filled to a vehicle, seal structures are required to make insides of the filling nozzle and the vehicle side filling port airtight state.

For example, in a conventional hydrogen filling apparatus 300 shown in FIG. 7, opening/closing a valve mechanism including a valve element 33 connected to a rod 32 of the nozzle 30 and a valve seat 31B that is a step portion of an in-pipe-joint passage 31A of the nozzle 30 performs filling/stopping of hydrogen gas. To perform filling of hydrogen gas, when a pipe joint 31 of the nozzle 30 and the receptacle 40 as the vehicle side filling port are connected with each other, an end (right end in FIG. 7) of the rod 32 is inserted into an engaging recessed portion 40A on the receptacle 40 side, and a swelling portion 34A at an end of a clutch 34 engages with an engaging channel 40B of the receptacle 40. Since a lever 35 is located radially outside the swelling portion 34A at an end of the clutch 34, unless the lever 35 moves in a direction that being separated from the receptacle 40 (left side in FIG. 7), the swelling portion 34A of the clutch 34 cannot be detached from the engaging channel 40B. Then, to prevent the lever 35 from moving in the direction that the lever 35 departs from the receptacle 40 (left side in FIG. 7) at filling, a lever holding mechanism 36 for maintaining a connection state between the pipe joint 31 of the filling nozzle 30 and the receptacle 40 is mounted in the pipe joint 31.

However, in the conventional technique shown in FIG. 7, in case that the lever 35 is not moved in a direction approaching the receptacle 40 and the lever 35 does not locate radially outward the projection 34A at an end portion of the clutch 34 when being connected to the pipe joint 31, there is a possibility that the projection 34A of the clutch 34 separates from the engaging channel 40B and the filling nozzle 30 is disconnected from the receptacle 40.

The contents of Japanese Patent Publication No. 2014-109350 is incorporated herein by reference in their entirety.

BRIEF SUMMARY

The present invention has been made in consideration of the above problems in the prior art, and the object thereof is to propose a filling apparatus in which when the pipe joint of the filling nozzle and the vehicle side filling port (receptacle) are connected with each other, a lever surely positions outward a swelling portion at an end of a clutch and a condition that the selling portion at the end of the clutch engages an engaging recessed portion of the receptacle is maintained, which allows a condition that the pipe joint of the filling nozzle and the vehicle side filling port (receptacle) are connected with each other to be continued.

A filling apparatus (100) of the present invention is characterized by including a storage tank for storing hydrogen fuel; a filling nozzle (10) for filling hydrogen from the storage tank via a fuel filling mechanism (dispenser, filling hose) and a vehicle side filling port (20) to an in-vehicle hydrogen filling tank; a clutch mechanism (12) for maintaining a condition that the filling nozzle (10) and the vehicle side filling port (20) are connected with each other; and a lever position moving mechanism (13: lever movement assisting member 14, springs 15, 16 and so on) for moving a lever (5) radially outward an end portion of the clutch mechanism (12) on a vehicle side filling port side when the filling nozzle (10) and the vehicle side filling port (20) are connected with each other.

In the present invention, it is preferable that the lever position moving mechanism (13) has a lever movement assisting member (14) including a first member (14A) locating in an area between a clutch (4) of the clutch mechanism (12) and the lever (5) and a second member (14B) locating radially inward the clutch (4), and the first member (14A) and the second member (14B) are integrally formed with each other. Further, it is preferable that the lever position moving mechanism (13) has a stator (17: ball); a channel portion (5D) formed on a radially inward surface of the lever (5), in the channel portion (5D) being insertable the stator (17); another channel portion (14AA) formed on a radially outward surface of the first member (14A) of the lever movement assisting member (14), in the channel portion (14AA) being insertable the stator (17); a first elastic member (15: spring) for energizing the lever (5) to the vehicle side filling port side (20); and a second elastic member (16: spring) for energizing the lever movement assisting member (13) to the vehicle side filling port (20) side. Then, it is preferable that the lever position moving mechanism (13) has a holding portion (1M: retainer) on a pipe joint main body (1) of the filling nozzle (10), the holding portion (1M) holding a position of the stator (17) in an axial direction of the filling nozzle (10), and the holding portion (1M) has a through hole (1MA) into which the stator (17) is fit.

In addition, in the present invention, it is preferable that the lever movement assisting member (14) has a plurality of opening portions (14AB) arranged at equal intervals in a circumferential direction, and the clutch (4) extends from an area radially inward the first member (14A) of the lever movement assisting member (14) via the opening portions (14AB) to the vehicle side filling port (20) side.

In the present invention, it is preferable that a rod (2: valve rod) having a valve element (2A) at an end is slidably arranged against an elastic member (3) in the pipe joint main body (1) of the filling nozzle (10). Then, it is preferable that another end of the rod (2: valve rod) contacts the vehicle side filling port (20).

In addition, it is preferable that a sealing structure (21) is arranged at a portion where an inner periphery (20D) of the vehicle side filling port (20) contacts the pipe joint main body (1).

The filling apparatus (100) according to the present invention has the lever position moving mechanism (13: lever movement assisting member 14, stators 17 and so on) for moving the lever (5) radially outward the vehicle side filling port (20) side end portion of the clutch mechanism (12) when the pipe joint main body (1) of the filling nozzle (10) and the vehicle side filling port (20) are connected with each other, the lever (5) surely moves on the vehicle side filling port side, and the lever (5) locates radially outward the swelling portion (4B) mounted on the end portion of the clutch (4). Therefore, it is prevented that the swelling portion (4B) mounted on the end portion of the clutch (4) moves radially outward. As a result, it is prevented that the clutch mechanism (12) is separated from the vehicle side filling port (20), so that it is surely prevented that the connection state between the pipe joint main body (1) of the filling nozzle (10) and the vehicle side filling port (20) with each other is released at hydrogen filling. Here, in the present invention, the clutch mechanism (12) for maintain the connection state between the filling nozzle (10) and the vehicle side filling port (20) is mounted, so that connecting the filling nozzle (10) and the vehicle side filling port (20) with each other with the clutch mechanism (12) at filling of hydrogen as fuel allows the filling nozzle (10) not to be disconnected from the vehicle side filling port (20).

It will be explained in detail about the lever position moving mechanism (13: lever movement assisting member 14, springs 15, 16 and so on) for moving the lever (5) radially outward the vehicle side filling port (20) side end portion of the clutch mechanism (12) when the filling nozzle (10) and the vehicle side filling port (20) are connected with each other. In a condition that the filling nozzle (10) and the vehicle side filling port (20) are not connected with each other as shown in FIG. 1, the stator (17: ball) whose axial position is held at a constant position in a holding portion (1M: retainer) fits into the channel portion (5D) of the lever (5), so that an axial position of the lever (5) is held at the constant position as same as the stator (17). Therefore, even if the lever (5) is energized by the first elastic member (15) on the vehicle side filling port (20) side, the lever (5) is held at the axial position where the stator (17) fits into the channel portion (5D) as shown in FIG. 1. Here, a side surface of the channel portion (5D) of the lever (5) inclines, so that elastically repulsive force of the first elastic member (15) has a component for energizing the stator (17) radially inward. In addition, elastically repulsive force of the second elastic member (16) energizes the lever movement assisting member (14) on the vehicle side filling port (20) side, so that the axial position of the channel portion (14AA) of the lever movement assisting member (14) does not match that of the stator (17).

In a condition that the filling nozzle (10) and the vehicle side filling port (20) are connected with each other, as shown in FIG. 2, the lever movement assisting member (14) is pressed by the filling nozzle (10) side end surface (20E) of the vehicle side filling port (20) (on the side separated from the vehicle side filling port (20)) to move against the elastically repulsive force of the second elastic member (16) on the side separated from the vehicle side filling port (20), and the axial position of the channel portion (14AA) of the lever movement assisting member (14) matches that of the stator (17). As described above, when the stator (17) received the component of the elastically repulsive force of the first elastic member (15) for energizing radially inward and the axial position of the channel portion (14AA) of the lever movement assisting member (14) matches that of the stator (17), the stator (17) separates from the channel portion (5D) of the lever (5) to move radially inward, and fits into the channel portion (14AA) of the lever movement assisting member (14). As a result, the lever (5) is not held by the stator (17), moves on the vehicle side filling port (20) side by the elastically repulsive force of the first elastic member (15), and locates radially outward the vehicle side filling port (20) side end portion of the clutch mechanism (12). Then, the lever (5) prevents the clutch (4) from moving radially outward, which prevents the connected condition between the filling nozzle (10) and the vehicle side filling port (20) from releasing.

In the present invention, the clutch mechanism (12) is mounted, so that it is unnecessary to mount a passage (branched passage 36A) in which a movable member is arranged (slide member 36B) and to mount a sealing structure (O-ring 36C) on the passage. Therefore, there is no possibility that the sealing structure deteriorates due to the slide member moving in the passage, so that possibilities of deterioration of the seal structure and gas leakage due to the deteriorated sealing structure can be decreased.

In addition, in the present invention, slidably arranging the rod (2: valve rod) having the valve element (2A) at the end against the elastic member (3) in the pipe joint main body (1) of the filling nozzle (10), the number of the sealing structures mounted in the filling nozzle (10) can be decreased, and durability of the filling nozzle (10) is improved. In this case, it is not required to arrange the sealing structure at a portion where the rod (2) slides, so that deterioration of the seal structure due to the slide of the rod (2) can be prevented. Then, in the present invention, contacting another end of the rod (2) to the vehicle side filling port (20) allows a passage in the filling nozzle (10) to open, that is, connections of the filling nozzle (10) to the vehicle side filling port (20) enable filling, so it is safe.

In the present invention, arranging a sealing structure in a portion where an inner periphery of the vehicle side filling port (20) contacts an outer periphery of the pipe joint main body (1) can prevent leakage of the hydrogen gas at filling of the hydrogen gas. Further, arranging a sealing structure in a portion of the vehicle side filling port (20) where contacting an outer periphery of the pipe joint main body (1) can prevent leakage of the hydrogen gas from a gap (ε1) between the portion of the vehicle side filling port (20) where contacting the outer periphery of the projecting portion (1E) of the pipe joint main body (1) and the outer periphery of the pipe joint main body (1).

Here, as shown in FIG. 7, the lever holding mechanism (36) of the filling nozzle (30) according to the conventional technique that maintains a connected state between the filling nozzle (30) and the vehicle side filling port (40) while hydrogen gas is filled is provided with a branched passage (36A) branched from the in-pipe-joint passage (31A), a lever holding slide member (36B) for slidably moving in the branched passage (36A), and a lever holding O-ring (36C). While the hydrogen gas is filled, pressure of the hydrogen gas flowing in the in-pipe-joint passage (31A) acts to the branched passage (36A), which causes the lever holding slide member (36B) to fall in FIG. 7. Falling of the lever holding slide member (36B) causes a rod (36D) of the lever holding slide member (36B) to project into the lever movement passage (31D) to prevent the lever (35) from separating from the vehicle side filling port (40), which maintains a connected state between the filling nozzle (30) and the vehicle side filling port (40). However, repeating attachment/detachment between the filling nozzle (30) and the vehicle side filling port (40) increases the number of slides of the lever holding slide member (36B) in the branched passage (36A), and the lever holding O-ring (36C) deteriorates to cause hydrogen gas to leak from the branched passage (36A) of the holding mechanism (36).

In contrast, in the present invention, since the filling apparatus (100, 101) include a clutch mechanism (12) for maintaining a connected state between the filling nozzle (10) and the vehicle side filling port (20), the filling nozzle (10) cannot be detached in a pressurized state. With the clutch mechanism (12), it is unnecessary, for example, to form the branched passage (36A) shown in FIG. 7; the slide member (36B) is not required to slide in the branched passage (36A); and the sealing structure (O-ring 36C) is not required to be provided in the branched passage (36A). As a result, there is no possibility that hydrogen gas leaks from the branched passage (36A) constituting the lever holding mechanism (36) in the prior art.

BRIEF DESCRIPTION OF THE DRAWINGS

FIG. 1 is a cross sectional view showing a condition that a pipe joint in an embodiment of the present invention is separated from a vehicle side filling port;

FIG. 2 is a cross sectional view showing a condition that the pipe joint in the embodiment is connected to the vehicle side filling port;

FIG. 3 is a perspective view showing a lever movement assisting member in the embodiment;

FIG. 4 is an enlarged view of the part pointed by symbol F4 in FIG. 1;

FIG. 5 is an enlarged view of the part pointed by symbol F5 in FIG. 2;

FIG. 6 is a brock diagram showing an outline of a hydrogen filling station; and FIG. 7 is a cross sectional view of a main part of a hydrogen filling apparatus according to the conventional technique.

DETAILED DESCRIPTION

Hereinafter, an embodiment of the present invention will be explained with reference to FIGS. 1 to 5. In FIG. 1, a filling nozzle 10 fills hydrogen from a hydrogen fuel storage tank 50 shown in FIG. 6 through a fuel filling system including a dispenser 60, a filling hose 45 and so on to an in-vehicle hydrogen filling tank 41. The filling nozzle 10 has a pipe joint main body 1, and on a central portion (a central portion in a vertical direction in FIG. 1) of a hydrogen supply source side (left side in FIG. 1) end of the pipe joint main body 1 is formed a hydrogen introducing port 1B connected to a filling hose side (not shown). Then, on a receptacle side (vehicle side filling port side, right side in FIG. 1) end of the pipe joint main body 1 is formed an opening 1C for inserting a receptacle 20 (shown in FIG. 2) therein. On a hydrogen supply source side (left side in FIG. 1) from the opening 1C in the pipe joint main body 1 is formed a receptacle insertion space 1D, when hydrogen is filled, the receptacle 20 is inserted into the pipe joint main body 1 (left side in FIG. 1) side from the opening 1C, and is situated in the receptacle insertion space 1D.

In FIG. 1, on a central portion in a vertical direction of the pipe joint main body 1 is formed an in-pipe-joint passage 1A, and the in-pipe-joint passage 1A extends from an opening 1B on the hydrogen supply source side to the space 1D on the receptacle side (extends from the left region to the right region in FIG. 1). In addition, on a receptacle side of the pipe joint main body 1 projects a hollow pipe joint middle projection 1E, and the pipe joint middle projection 1E forms an end portion of the in-pipe-joint passage 1A on the receptacle side.

In the in-pipe-joint passage 1A extending in a horizontal direction in FIG. 1 are formed two enlarged regions that are a valve element accommodating portion 1F and an enlarged diameter portion 1G. In the in-pipe-joint passage 1A is accommodated a rod 2. On an end of the rod 2 is mounted a valve element 2A, and the valve element 2A is accommodated in the valve element accommodating portion 1F of the in-pipe-joint passage 1A. In the valve element accommodating portion 1F, on the hydrogen supply source side (left side in FIG. 1) from the valve element 2A is arranged a spring 3 as an elastic member.

The rod 2 can slide in the in-pipe-joint passage 1A (in a horizontal direction in FIG. 1), and in a condition shown in FIG. 1, that is, in a condition that the pipe joint main body 1 is not connected to the receptacle 20 (shown in FIG. 2), the valve element 2A is urged by an elastically repulsive force of the spring 3 to the receptacle side (right side in FIG. 1), and seats on a valve seat 1H constituted by a step portion at an end (right end portion in FIG. 1) of the valve element accommodating portion 1F. As shown in FIG. 1, in case that the pipe joint main body 1 is not connected to the receptacle 20 (shown in FIG. 2), an end portion of the receptacle side of the rod 2 projects on the receptacle side (right side in FIG. 1) from the receptacle side end portion of the pipe joint middle projection 1E. A region that the rod 2 projects from the pipe joint middle projection 1E is shown with the symbol TA. Here, projecting amount (projecting length) of the region TA is determined based on a distance that the rod 2 moves to the left side in FIG. 1 (a direction apart from the receptacle 20) while hydrogen is filled and so on (refer to FIG. 2).

As same as the conventional technique shown in FIG. 7, the rod 2 has a hollow portion, and the hollow portion forms an in-rod passage 2B. The small-diameter portion 2C connected to the valve element 2A and the large-diameter portion 2D forming the hollow portion are connected by a diameter changing portion 2F forming the openings 2E. The diameter changing portion 2F of the rod 2 is accommodated in the enlarged diameter portion 1G of the in-pipe-joint passage 1A. While hydrogen gas is filled (refer to FIG. 2), from a dispenser not shown in FIG. 1 (refer to FIG. 6: arranged in the left side region in FIG. 1) through the valve element 2A into the in-pipe-joint passage 1A flows hydrogen gas, and the hydrogen gas flows in the in-rod passage 2B thought the openings 2E of the diameter changing portion 2F of the rod 2 accommodated in the enlarged diameter portion 1G of the in-pipe-joint passage 1A. In FIG. 1, a receptacle side end surface (right end surface in FIG. 1) of the diameter changing portion 2F of the rod 2 abuts against a step portion 1I of the enlarged diameter portion 1G of the in-pipe-joint passage 1A. But, the receptacle side end surface of the diameter changing portion 2F and the step portion 1I of the enlarged diameter portion 1G of the in-pipe-joint passage 1A do not have a function as an opening/closing valve.

At a radially outer portion of the in-pipe-joint passage 1A on the receptacle side (right side in FIG. 1) is mounted a clutch 4 with a hollow cylinder shape. On an end portion of the clutch 4 on the hydrogen supply source side (left side in FIG. 1) is formed a locking portion 4A projecting radially inward, and the locking portion 4A engages a clutch engaging channel 1J formed on the pipe joint main body 1 to be fixed thereto. On the other hand, on an end of the clutch 4 on the receptacle side (right side in FIG. 1) is formed a swelling portion 4B swelling radially outward and inward to be a thicker portion. When the filling nozzle 10 and the receptacle 20 (FIG. 2) are connected with each other (while hydrogen is filled), a radially inner portion of the swelling portion 4B engages an engaging channel 20A of the receptacle 20 (refer to FIG. 2).

Outside the clutch 4 in a radial direction is mounted a lever 5. The lever 5 is integrally formed with a lever grasping portion 5A, and moving the lever 5 in a direction of the arrow H while grasping the lever grasping portion 5A causes an end portion of the lever 5 on the receptacle side (right side in FIG. 1) to be positioned radially outside the swelling portion 4B of the clutch 4, which can prevent the swelling portion 4B of the clutch 4 from detaching from the engaging channel 20A (FIG. 2) of the receptacle 20. Or, positioning an end portion of the lever 5 on the receptacle side at a place where the end portion disengaged from a radially outer portion of the swelling portion 4B of the clutch 4, for example, at a position on the hydrogen supply side (left side in FIG. 1) can allow the swelling portion 4B of the clutch 4 to be disengaged from the engaging channel 20A of the receptacle 20. More precisely, as shown in FIG. 2, in order to disconnect the filling nozzle 10 from the receptacle 20 where the filling nozzle 10 (the pipe joint main body 1) and the receptacle 20 are connected with each other, a worker grasps the lever grasping portion 5A and moves the lever left in FIGS. 1 and 2 (on the side apart from the receptacle 20), which causes an end portion of the lever 5 on the receptacle side (right end portion in FIGS. 1 and 2) to move from a radially outer portion of the swelling portion 4B of the clutch 4. As a result, the swelling portion 4B of the clutch 4 becomes movable radially outwardly, and the radially outward movement of the swelling portion 4B allows the swelling portion 4B to be disengaged from the engaging channel 20A of the receptacle 20.

In FIG. 1 again, on the pipe joint main body 1 are formed a lever opening portion 1K for allowing the lever 5 to move in a direction of the allow H and a lever movement passage 1L. In addition, a crutch mechanism 12 for holding the lever 5 outside the swelling portion 4B of the clutch 4 at the connection of the filling nozzle 10 and the receptacle 20 (FIG. 2: when hydrogen is fed) will be explained below in detail.

In FIG. 2 showing a condition that the filling nozzle 10 (the pipe joint main body 1) and the receptacle 20 are connected with each other, the receptacle 20 is inserted into the receptacle insertion space 1D in the pipe joint main body 1 from the opening 1C of the pipe joint main body 1. In the condition that the filling nozzle 10 and the receptacle 20 are not connected with each other shown in FIG. 1, the projecting region TA of the rod 2 projects on the receptacle 20 side from the pipe joint middle projection 1E, but in the connected condition shown in FIG. 2, the projecting region TA of the rod 2 contacts the bottom portion 20C of the engaging recessed portion of the receptacle 20 to be pressed, and the whole rod 2 moves left (the direction separating from the receptacle 20) in FIGS. 1 and 2 from the condition shown in FIG. 1. At that time, the rod 2 moves left by the projecting amount of the projecting region TA shown in FIG. 1 until an end portion (right end) of the projecting region TA on the receptacle side (refer to FIG. 1) reaches the receptacle side end portion (right end) of the pipe joint middle projection 1E.

In accordance with the left movement of the rod 2, the valve element 2A at an end of the rod 2 departs from the valve seat 1H against elastically repulsive force of the spring 3. Then, from a gap between the valve seat 1H and the valve element 2A, hydrogen gas inflows into the in-pipe-joint passage 1A. The hydrogen gas inflowing into the in-pipe-joint passage 1A is fed through the openings 2E, the in-rod passage 2B of the rod 2 and the in-receptacle passage 20B into the in-vehicle hydrogen filling tank 41 (FIG. 6) not shown in FIG. 2.

In FIG. 2, when hydrogen gas flows through the in-pipe-joint passage 1A and the in-rod passage 2B, even if there is hydrogen gas that does not flow from the openings 2E of the rod 2 to the in-rod passage 2B but flows in a gap $δ1$ between the outer peripheral surface of the rod large-diameter portion 2D and the inner peripheral surface of the in-pipe-joint passage 1, the hydrogen gas reaches the bottom portion 20C of the engaging recessed portion of the receptacle 20 to inflow into the in-receptacle passage 20B and not to leak outside the pipe joint main body 1. Here, on a portion where the inner peripheral surface 20D of the engaging recessed portion of the receptacle 20 contacts the outer periphery of the pipe joint middle projection 1E is mounted the receptacle side O-ring 21. Even if there is hydrogen gas that flows from the bottom portion 20C of the receptacle engaging recessed portion to a gap $ε1$ between the inner wall surface 20D of the receptacle engaging recessed portion and the outer peripheral surface of the pipe joint middle projection 1E, the hydrogen gas is blocked by the receptacle side O-ring 21, so that the hydrogen gas does not leak outside the pipe joint main body 1.

As it is clear from FIGS. 1 and 2, the rod 2 slides on the in-pipe-joint passage 1A, but hydrogen gas does not leak outside the pipe joint main body 1 even if no O-ring is mounted on a portion where the rod 2 slides. In addition, before the pipe joint main body 1 and the receptacle 20 are connected with each other as shown in FIG. 1, the valve element 2A seats on the valve seat 1H, so that into the in-pipe-joint passage 1A does not inflow hydrogen gas, and there is no possibility that hydrogen gas leaks from the gap between the pipe joint main body 1 and the receptacle 20.

In the condition that the pipe joint main body 1 and the receptacle 20 are connected with each other shown in FIG. 2, the hydrogen gas flowing in the in-pipe-joint passage 1A flows into the in-rod passage 2B or the gap $δ1$ between the outer peripheral surface of the rod large-diameter portion 2D and the inner peripheral surface of the in-pipe-joint passage 1A to reach the bottom portion 20C of the receptacle engaging recessed portion and flow into the in-receptacle passage 20B, so that the hydrogen gas does not leak outside the pipe joint main body 1 and the receptacle 20. Therefore, in the embodiment, even if no O-ring is disposed on a portion where the rod 2 slides on the in-pipe-joint passage 1A, hydrogen gas does not leak outside the pipe joint main body 1 and the receptacle 20. As a result, it is not necessary to mount an O-ring that is deteriorated by sliding the rod 2, and deterioration of the O-ring due to sliding of the rod 2 can be prevented to prevent leakage of the hydrogen gas. In addition, the number of sealing structures in the filling nozzle 10 is decreased and durability is improved.

In the embodiment shown in figures, the filling apparatus 100 has a lever position moving mechanism 13 (a lever movement assisting member 14, a stators 17 and so on). The lever position moving mechanism 13 moves the lever 5 radially outward the vehicle side filling port 20 side end portion of a clutch mechanism 12 (described below in detail) when the filling nozzle 10 and the vehicle side filling port 20 are connected with each other (at the time of hydrogen filling). In FIGS. 1 and 2, the lever position moving mechanism, to the whole of which is applied numeral 13, has the lever movement assisting member 14. The lever movement assisting member 14 has the first member 14A locating in an area between the clutch 4 and the lever 5 of the clutch mechanism 12 in the radial direction of the filling nozzle 10, and the second member 14B locating radially inward the clutch 4, and the first member 14A and the second member 14B are integrally formed with each other. FIG. 3 shows a perspective view of the lever movement assisting member 14, and the first member 14A is continuously mounted on the second member 14B with a cylindrical shape (hollow cylindrical shape). The diameter size of the first member 14A is larger than that of the second member 14B. On the first member 14A, a plurality of opening portions 14AB are arranged at equal intervals in the circumferential direction. The clutch 4 (FIGS. 1 and 2) extends from an area radially inward the first member 14A of the lever movement assisting member 14 via the opening portions 14AB to the vehicle side filling port 20 side (FIGS. 1 and 2). On the radially outward surface of the first member 14A is formed a channel portion 14AA in which the stators 17 (FIGS. 1 and 2) can be inserted.

In FIGS. 1 and 2, the lever position moving mechanism 13 has the stators 17 (balls); a channel portion 5D formed on the radially inward surface of the lever 5, the channel portion 5D in which the stators 17 can be inserted; the channel portion 14AA (described above in FIG. 3) formed on the radially outward surface of the first member 14A of the lever movement assisting member 14, the channel portion 14AA in which the stators 17 can be inserted; the first elastic member 15 (spring) for energizing the lever 5 to the vehicle side filling port 20 side; and the second elastic member 16 (spring) for energizing the lever movement assisting member 14 to the vehicle side filling port 20 side. On the pipe joint main body 1 of the filling nozzle 10 is mounted a holding portion 1M (retainer), and the stators 17 fit into a through hole 1MA formed on the holding portion 1M to be held in an axial home position in FIG. 1. The holding portion 1M is a component of the lever position moving mechanism 13 also.

One end of the first elastic member 15 is engaged with (abutted on) a hydrogen supplying side end portion (left side in FIG. 1) in a lever moving route 1L formed in the pipe joint main body 1, and the first elastic member 15 energizes the lever 5 to the vehicle side filling port 20 side (right side in FIG. 1). One end of the second elastic member 16 is engaged with (abutted on) an engaging portion 4A of the clutch 4, and the second elastic member 16 energizes the second member 14B of the lever movement assisting member 14 to the vehicle side filling port 20 side. As shown in FIG. 4, into the channel portion 5D formed on the radially inward surface of the lever 5 (inner peripheral surface) can be inserted the stators 17, and the side surface of the channel portion 5D inclines (inclined portion 5DA). In a condition that the stators 17 fit into the channel portion 5D, The side surface (inclined portion 5DA) of the channel portion 5D generates the component R1 (lower side in FIG. 4) for emerging the stators 17 radially inward based on the elastically repulsive force F15 (FIG. 1) of the first elastic member 15 (FIG. 1). Meanwhile, the lever movement assisting member 14 (first member 14A) extends radially inward the holding portion 1M (lower side in FIG. 4), and the channel portion 14AA is formed radially outward the lever movement assisting member 14 (upper side in FIG. 4), the channel portion 14AA in which the stators 17 can be inserted.

In the condition that the filling nozzle 10 and the vehicle side filling port 20 are not connected with each other as shown in FIG. 1, the axial position of the channel portion 5D of the lever 5 matches that of the stators 17 held by the holding portion 1M. On the other hand, in the condition that the filling nozzle 10 and the vehicle side filling port 20 are not connected with each other as shown in FIG. 1, the axial position of the channel portion 14AA of the first member 14A of the lever movement assisting member 14 locates near the vehicle side filling port 20 side relative to that of the stators 17. Then, in the condition that the filling nozzle 10 and the vehicle side filling port 20 are connected with each other as shown in FIG. 2, the axial position of the channel portion 14AA matches those of the stators 17 (the stators 17 fits into the holding portion 1M and separate from channel portion 5D of the lever 5).

In the condition that the filling nozzle 10 and the vehicle side filling port 20 separate from each other (non-connected state: FIG. 1), the stators 17 whose axial positions are held at constant positions by the holding portion 1M fit into the channel portion 5D of the lever 5, and the axial positions of the stators 17 are held at constant positions by the holding portion 1M, so that the axial position of the lever 5 is held at a constant position by the stators 17. In the condition shown in FIG. 1, the lever movement assisting member 14 is energized by the elastically repulsive force of the second elastic member 16 on the vehicle side filling port 20 side (right side in FIG. 1), and the axial position of the channel portion 14AA of the lever movement assisting member 14 near the vehicle side filling port 20 side (right side in FIG. 1) from those of the stators 17 (or position of the channel portion 5D of the lever 5). Therefore, even if energized by the first elastic member 15 on the vehicle side filling port 20 side, the stators 17 fit into the channel portion 5D of the lever 5, so that the axial position of the lever 5 is held at the constant position shown in FIG. 1.

On the other hand, in the condition that the filling nozzle 10 and the vehicle side filling port 20 are connected with each other as shown in FIG. 2, the lever movement assisting member 14 is pressed on the side separated from the vehicle side filling port 20 (left side in FIG. 2) by the filling nozzle 10 side end surface 20E of the vehicle side filling port 20. Therefore, the lever movement assisting member 14 moves against the elastically repulsive force of the second elastic member 16 on the side separated from the vehicle side filling port 20 (left side in FIG. 2). Then, the lever movement assisting member 14 moves leftward in FIG. 2 until the axial position of the channel portion 14AA of the lever movement assisting member 14 matches those of the stators 17.

As described above while referring to FIG. 4, the component R1 of the elastically repulsive force F15 of the first elastic member 15 energizes the stators 17 radially inward, when the axial position of the channel portion 14AA of the lever movement assisting member 14 matches those of the stators 17, the stators 17 move radially inward to separate from the channel portion 5D of the lever 5, and fit into the channel portion 14AA of the lever movement assisting member 14. As a result, the lever 5 is not held by the stators 17. Then, the elastically repulsive force of the first elastic member 15 moves the lever 5 on the vehicle side filling port 20 side, and the vehicle side filling port 20 side end portion of the lever 5 locates radially outward the vehicle side filling port 20 side end portion of the clutch mechanism 12. The vehicle side filling port 20 side end portion of the lever 5 locating radially outward the vehicle side filling port 20 side end portion of the clutch mechanism 12 prevents the swelling portion 4B mounted on the end portion of the clutch 4 from moving radially outward, and it is prevented that the connection between the filling nozzle 10 and the vehicle side filling port 20 is released. To obtain the above action effect, it is necessary to properly design the axial positions of the stators 17 held by the holding portion 1M, the channel portion 5D of the lever 5 and the lever movement assisting member 14 of the channel portion 14AA, elastic coefficients of the first elastic member 15 and the second elastic member 16, and so on.

Next, it will be explained the process from the condition that the filling nozzle 10 and the vehicle side filling port 20 are connected with each other (shown in FIG. 2) to the condition that the filling nozzle 10 is separated from the vehicle side filling port 20 to release the connection between the filling nozzle 10 and the vehicle side filling port 20. In a condition that pressure does not act on the filling nozzle 10 after hydrogen is filled to a vehicle not shown, the lever 5 is returned on the side separated from the vehicle side filling port 20 (left side in FIG. 2) against the elastically repulsive force of the first elastic member 15. Here, when the filling nozzle 10 and the vehicle side filling port 20 are separated from each other, high pressure of hydrogen does not act on the filling nozzle 10, and action for preventing connected condition between the filling nozzle 10 and the vehicle side filling port 20 from releasing (described below in FIG. 5) does not exert. Therefore, the lever 5 can be returned on the side separated from the vehicle side filling port 20 (left side in FIG. 2) by hand.

When the lever 5 is returned on the side separated from the vehicle side filling port 20 and the axial position of the channel portion 5D of the lever 5 matches those of the stators 17, the stators 17 fit into the channel portion 5D. Fitting the stators 17 into the channel portion 5D holds the axial position of the lever 5 at a constant position in the condition that the filling nozzle 10 and the vehicle side filling port 20 are separated from each other as shown in FIG. 1. In the channel portion 14AA of the lever movement assisting member 14, the force for returning the lever 5 on the side separated from the vehicle side filling port 20 (left side in FIG. 2) generates a component force directing radially outward. When the axial position of the channel portion 5D of the lever 5 matches those of the stators 17, the component force directing radially outward acts on the stators 17 to separate them from the channel portion 14AA, and the stators 17 fit into the channel portion 5D of the lever 5. After the stators 17 separate from the channel portion 14AA of the lever movement assisting member 14, the lever movement assisting member 14 moves on the vehicle side filling port 20 side by the elastically repulsive force of the second elastic member 16 to locate in the position shown in FIG. 1.

As described above, in the embodiment shown in FIGS. 1 and 2 also exists the clutch mechanism 12 for holding the lever 5 to prevent the swelling portion 4B of the clutch 4 from detaching from the engaging channel 20A of the receptacle 20 when the filling nozzle 10 and the receptacle 20 are connected with each other (when hydrogen is fed). But, the mechanism does not exist in FIG. 7. In FIG. 2, the clutch mechanism 12 has a function of holding a receptacle side end portion of the lever 5 outside the swelling portion 4B of the clutch 4 in a radial direction, and preventing the clutch 4 from detaching from the engaging channel 20A of the receptacle 20. Then, the clutch mechanism 12 includes the projection 5B (projection of the lever) formed on the receptacle side (right side in FIGS. 1 and 2) end portion of the lever 5 and a ring-shaped elastic member 6 (O-ring for example) disposed on the side separated from the receptacle 20 (left side in FIGS. 1 and 2) from the projection 5B of the lever 5. The projection 5B formed on the receptacle side end portion of the lever 5 projects radially inward. Then, the ring-shaped elastic member 6 fits in an elastic body channel 5C formed near the receptacle side end portion of the lever 5.

When the pipe joint main body 1 and the receptacle 20 are connected with each other as shown in FIG. 2, the valve element 2A mounted on an end of the rod 2 separates from the valve seat 1H, and the hydrogen gas inflows into the in-pipe-joint passage 1A and flows through the in-rod passage 2B and the in-receptacle passage 20B. At that time, hydrogen gas is extremely high in pressure (70 MPa for example), so that a tensile force F1 (FIG. 2) separating the pipe joint main body 1 from the receptacle 20 acts thereon. As a result that the tensile force F1 acts on the pipe joint main body 1, by an action between an inclined surface 4BA located on the side (left side in FIG. 2) that is separated from the receptacle 20 of the swelling portion 4B of the clutch 4 and an inclined surface 20AA located on the side (left side in FIG. 2) that is separated from the receptacle 20 of the receptacle engaging channel 20A, a radially outward force RO acts on the clutch 4 as a component force of the tensile force F1 to move the clutch 4 outward in a radial direction.

As shown in FIG. 5 enlarging a part F5 in FIG. 2, when the clutch 4 moves outward in a radial direction by the radially outward force RO, the elastic member 6 is squeezed in a radial direction. As a result, the end surface 4BB of the swelling portion 4B of the clutch 4 and the end surface 5BA of the projection 5B of the lever 5 abut with each other in the region FT. Since the end surface 4BB and the end surface 5BA abut with each other, the lever 5 cannot move from a condition shown in FIG. 5 in a direction (left side FIGS. 2 and 5) separating from the receptacle 20. The lever 5 does not move, so that the lever 5 continues positioning outward the swelling portion 4B of the clutch 4 in a radial direction to prevent the clutch 4 from moving outward in a radial direction. Therefore, without detaching the swelling portion 4B of the clutch 4 from the engaging channel 20A of the receptacle 20, it is prevented that the connection between the pipe joint main body 1 and the receptacle 20 is released. In addition, to exhibit action effect described above is properly designed elastic coefficient of the elastic member 6, projecting amount of the elastic member 6 to the crutch 4, projecting amount of the projection 5B of the lever 5 to the crutch 4, inclination angle of the inclined surface 4BA of the swelling portion 4B (FIGS. 2 and 5), inclination angle of the inclined surface 20AA of the receptacle engaging channel 20A (FIGS. 2 and 5), and so on.

In FIGS. 2 and 5, when filling hydrogen gas is finished and a predetermined depressurizing work is finished, the tensile force F1 resulting from high pressure of the hydrogen gas disappears. In accordance with the above, the radially outward force RO acting on the clutch 4 disappears to allow the clutch 4 to return to a radially inner position (position before hydrogen gas is filled). Since the clutch 4 returns to the radially inner position (position before hydrogen gas is filled), the ring-shaped elastic member 6 mounted adjacent to an end of the lever 5 returns to a cross-sectionally circular shape from the squeezed shape shown in FIG. 5, and the end surface 4BB of the swelling portion 4B of the clutch 4 and the end surface 5BA of the projection 5B of the lever 5 become a state that their relative positions in a radial direction (vertical position in FIG. 5) are different from each other. So, the end surface 4BB and the end surface 5BA do not contact with each other not to become the condition like the region FT shown in FIG. 5. Therefore, the lever 5 becomes, unlike the condition shown in FIG. 5, movable in a direction (left side FIGS. 2 and 5) separating from the receptacle 20, and when the lever 5 is moved in the direction (left side FIGS. 2 and 5) separating from the receptacle 20, the lever 5 does not position outward the swelling portion 4B of the clutch 4 in a radial direction, and it becomes possible that the swelling portion 4B of the clutch 4 detaches from the engaging channel 20A of the receptacle 20. Then, the connection between the pipe joint main body 1 and the receptacle 20 can be released.

In the embodiment shown in FIGS. 1 to 5, the clutch mechanism 12 for holding the lever 5 and preventing the clutch 4 from detaching from the engaging channel 20A of the receptacle 20 has a different structure from the lever holding mechanism 36 shown in FIG. 7, and it is unnecessary to mount the branched passage 36A branched from the in-pipe-joint passage 31A and the member 36B sliding in the branched passage (lever holding slide member shown in FIG. 7), and to mount the O-ring 36C (lever holding O-ring) to the member. Therefore, it is prevented that the O-ring mounted on the mechanism for holding lever deteriorates to leak hydrogen gas.

The filling apparatus 100 in the embodiment shown in FIGS. 1 to 5 has the lever position moving mechanism 13 (the lever movement assisting member 14, the stators 17 and so on) for moving the lever 5 radially outward the vehicle side filling port 20 side end portion of the clutch mechanism 12 when the filling nozzle 10 and the vehicle side filling port 20 are connected with each other, so that the pipe joint main body 1 of the filling nozzle 10 and the vehicle side filling port 20 are connected with each other, the lever 5 surely moves on the vehicle side filling port side, and the lever 5 locates radially outward the swelling portion 4B mounted on the end portion of the clutch 4. Therefore, it is prevented that the swelling portion 4B mounted on the end portion of the clutch 4 moves radially outward (by the lever 5). As a result, it is prevented that the clutch mechanism 12 is separated from the vehicle side filling port 20, so that it is surely prevented that the connected state between the pipe joint main body 1 of the filling nozzle 10 and the vehicle side filling port 20 is released at the time of hydrogen filling. In addition, the lever position moving mechanism 13 is mechanically configured with the movement assisting member 14, the stators 17, the first elastic member 15, the second elastic member 16, the holding portion 1M and so on, so that the lever position moving mechanism 13 can be operated without electric power, fluid pressure or the like, which can be expected for simple construction and sure action.

With the filling apparatus 100 shown in FIGS. 1 to 5, inside the pipe joint main body 1 of the filling nozzle 10 is slidably mounted the rod 2 having the valve element 2A at its end against the spring 3 (elastic member). While hydrogen is filled, hydrogen gas flowing in the in-pipe-joint passage 1A flows through the in-rod passage 2B and the gap $δ1$ between the outer peripheral surface of the rod large-diameter portion 2D and the inner peripheral surface of the in-pipe-joint passage 1A without leaking outside the pipe joint main body 1 to reach the bottom portion 20C of the receptacle engaging recessed portion and to inflow into the in-receptacle passage 20B. Therefore, it is unnecessary to mount an O-ring on a portion where the rod 2 slides in the filling nozzle 10. So, it can be prevented that the sealing structure (O-ring) deteriorates due to the slide of the rod 2.

In the embodiment shown in FIGS. 1 to 5, at hydrogen filling operation, after one end of the rod 2 contacts the bottom portion 20C of the engaging recessed portion of the receptacle 20 (vehicle side filling port), a passage is opened to enable filling, so it is safe. In addition, in the embodiment, on the inner peripheral surface 20D of the engaging recessed portion of the receptacle 20 is mounted a receptacle side O-ring 21 on a portion where the inner peripheral surface 20D contacts the outer periphery of the pipe joint middle projection 1E, so that while hydrogen gas is filled, the hydrogen gas is prevented from leaking from the gap $ε1$ between a portion where the receptacle 20 contacts the outer periphery of the pipe joint main body 1 and the outer periphery of the pipe joint main body 1.

Further, in the embodiment, the clutch mechanism 12 for maintaining a connected state between the filling nozzle 10 and the receptacle 20 (vehicle side filling port) is mounted, and when hydrogen is filled after the filling nozzle 10 and the receptacle 20 are connected with each other, the clutch 4 squeezes the elastic member 6 in a radial direction to contact the end surface 4BB of the swelling portion 4B of the clutch 4 and the end surface 5BA of the projection 5B of the lever 5 with each other, so that the lever 5 cannot move in a direction separating from the receptacle 20. Therefore, while hydrogen is filled after the filling nozzle 10 and the receptacle 20 are connected with each other, the filling nozzle 10 cannot be detached from the receptacle 20. With the clutch mechanism 12, it is unnecessary to form the branched passage 36A shown in FIG. 7; the slide member 36B is not required to slide in the branched passage 36A; and the sealing structure (O-ring 36C) is not required to be mounted on the branched passage 36A. Therefore, there is no possibility that hydrogen gas leaks from the branched passage 36A constructing the lever holding mechanism 36 according to the conventional technique.

Since the embodiments shown in the drawings are merely examples, and the embodiments do not limit the technical scope of the present invention.

DESCRIPTION OF THE REFERENCE NUMERALS 1 pipe joint main body
2 rod
2A valve element
3 spring
4 clutch
5 lever
5D channel portion
6 elastic member (O-ring etc.)
10 filling nozzle
12 clutch mechanism
13 lever position moving mechanism
14 lever movement assisting member
14A first member
14AA channel portion
14AB opening portion
14B second member
15 first elastic member (spring)
16 second elastic member (spring)
17 stator (ball)
20 receptacle (vehicle side filling port)
20D inner peripheral surface
21 receptacle side O-ring
100 filling apparatus 1M holding portion (retainer)
1MA through hole

What is claimed is:

1. A filling apparatus comprising:
a storage tank for storing hydrogen fuel;
a filling nozzle for filling hydrogen from the storage tank via a fuel filling mechanism and a vehicle side filling port to an in-vehicle hydrogen filling tank;
a clutch mechanism for maintaining a condition that the filling nozzle and the vehicle side filling port are connected with each other; and
a lever position moving mechanism for urging a lever toward a desired operative position, a portion of the lever being positioned radially outward relative to an end portion of the clutch mechanism when the filling nozzle and the vehicle side filling port are connected with each other;
the lever position moving mechanism having a lever movement assisting member including a first member locating in an area between a clutch of the clutch mechanism and the lever and a second member locating radially inward the clutch, and the first member and the second member are integrally formed with each other.

2. The filling apparatus as claimed in claim 1, wherein the lever position moving mechanism has a stator; a channel portion formed on a radially inward surface of the lever, in the channel portion being insertable the stator; another channel portion formed on a radially outward surface of the first member of the lever movement assisting member, in the channel portion being insertable the stator; a first elastic member for energizing the lever to the vehicle side filling port side; and a second elastic member for energizing the lever movement assisting member to the vehicle side filling port side.

3. The filling apparatus as claimed in claim 2, wherein the lever position moving mechanism has a holding portion on a pipe joint main body of the filling nozzle, the holding portion holding a position of the stator in an axial direction of the filling nozzle, and the holding portion has a through hole into which the stator is fit.

4. The filling apparatus as claimed in claim 2, wherein the lever movement assisting member has a plurality of opening portions arranged at equal intervals in a circumferential direction, and the clutch extends from an area radially inward the first member of the lever movement assisting member via the opening portions to the vehicle side filling port side.

5. The filling apparatus as claimed in claim 2, wherein the lever movement assisting member has a plurality of opening portions arranged at equal intervals in a circumferential direction, and the clutch extends from an area radially inward the first member of the lever movement assisting member via the opening portions to the vehicle side filling port side.

6. The filling apparatus as claimed in claim 3, wherein the lever movement assisting member has a plurality of opening portions arranged at equal intervals in a circumferential direction, and the clutch extends from an area radially inward the first member of the lever movement assisting member via the opening portions to the vehicle side filling port side.

7. A filling apparatus comprising:
a storage tank for storing hydrogen fuel;
a filling nozzle for filling hydrogen from the storage tank via a fuel filling mechanism and a vehicle side filling port to an in-vehicle hydrogen filling tank;
a clutch mechanism for maintaining a condition that the filling nozzle and the vehicle side filling port are connected with each other; and
a lever movement assisting member including a first annular member positioned radially outside the clutch mechanism, a second annular member positioned radially inside the clutch mechanism, and a plurality of ribs extending between the first and second annular members to define a corresponding plurality of openings therebetween.

8. The filling apparatus recited in claim 7, wherein the clutch mechanism passes through at least one of the plurality of openings defined by the lever movement assisting member.

9. The filling apparatus recited in claim 7, wherein the first annular member is of a first diameter and the second annular member is of a second diameter less than the first diameter.

10. The filling apparatus recited in claim 7, wherein the filling nozzle defines an outer periphery larger than an outer periphery of the lever movement assisting member.

* * * * *